(12) United States Patent
Small et al.

(10) Patent No.: US 7,604,474 B1
(45) Date of Patent: Oct. 20, 2009

(54) DENT REMOVAL SYSTEM

(76) Inventors: Lee M. Small, 1938 19th St., Apartment #4, Santa Monica, CA (US) 90404; Lanceolot Small, 1938 19th St., Apartment #4, Santa Monica, CA (US) 90404

(*) Notice: Subject to any disclaimer, the term of this patent is extended or adjusted under 35 U.S.C. 154(b) by 491 days.

(21) Appl. No.: 11/477,128

(22) Filed: Jun. 27, 2006

(51) Int. Cl.
*B21D 1/00* (2006.01)

(52) U.S. Cl. .................. 425/318; 425/385; 72/447; 72/705

(58) Field of Classification Search .......... 425/318, 425/384–385, 403; 72/447, 705
See application file for complete search history.

(56) References Cited

U.S. PATENT DOCUMENTS

| | | | | |
|---|---|---|---|---|
| 2,788,831 A | * | 4/1957 | Weiner | 72/415 |
| 4,358,946 A | * | 11/1982 | Gallart | 72/705 |
| 4,584,863 A | * | 4/1986 | Gaston et al. | 72/705 |
| 7,104,107 B2 | * | 9/2006 | Buckler et al. | 72/447 |

* cited by examiner

*Primary Examiner*—Yogendra Gupta
*Assistant Examiner*—Thu Khanh T Nguyen

(57) ABSTRACT

A dent removal system includes a plurality of elongated members. Each of the elongated members has a first end and a second end and each of the elongated members has a different shape and size with respect to each other. A plurality of heads is provided and each has a first side and a second side. The heads each have a different shape with respect to each other. A plurality of couplers is provided. The second sides each have one of the couplers attached thereto. Each of the couplers is configured to releasably secure a selected one of the heads to a selected one of the second ends. The first side of the selected one of the heads is positioned against an inner surface of a bumper while an outer surface the bumper is heated to conform the bumper to the first side of the selected one of the heads.

11 Claims, 6 Drawing Sheets

1

DENT REMOVAL SYSTEM

BACKGROUND OF THE INVENTION

1. Field of the Invention

The present invention relates to dent removal devices and more particularly pertains to a new dent removal device for assisting a person in removing a dent from a plastic bumper.

2. Description of the Prior Art

The use of dent removal devices is known in the prior art. While these devices fulfill their respective, particular objectives and requirements, the need remains for a system for easily removing a dent in a plastic bumper by heating the plastic and pushing the dent out of the bumper.

SUMMARY OF THE INVENTION

The present invention meets the needs presented above by generally comprising a plurality of elongated members. Each of the elongated members has a first end and a second end and each of the elongated members has a different shape and size with respect to each other. A plurality of heads is provided and each has a first side and a second side. The heads each have a different shape with respect to each other. A plurality of couplers is provided. The second sides each have one of the couplers attached thereto. Each of the couplers is configured to releasably secure a selected one of the heads to a selected one of the second ends. The first side of the selected one of the heads is positioned against an inner surface of a bumper while an outer surface the bumper is heated to conform the bumper to the first side of the selected one of the heads.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
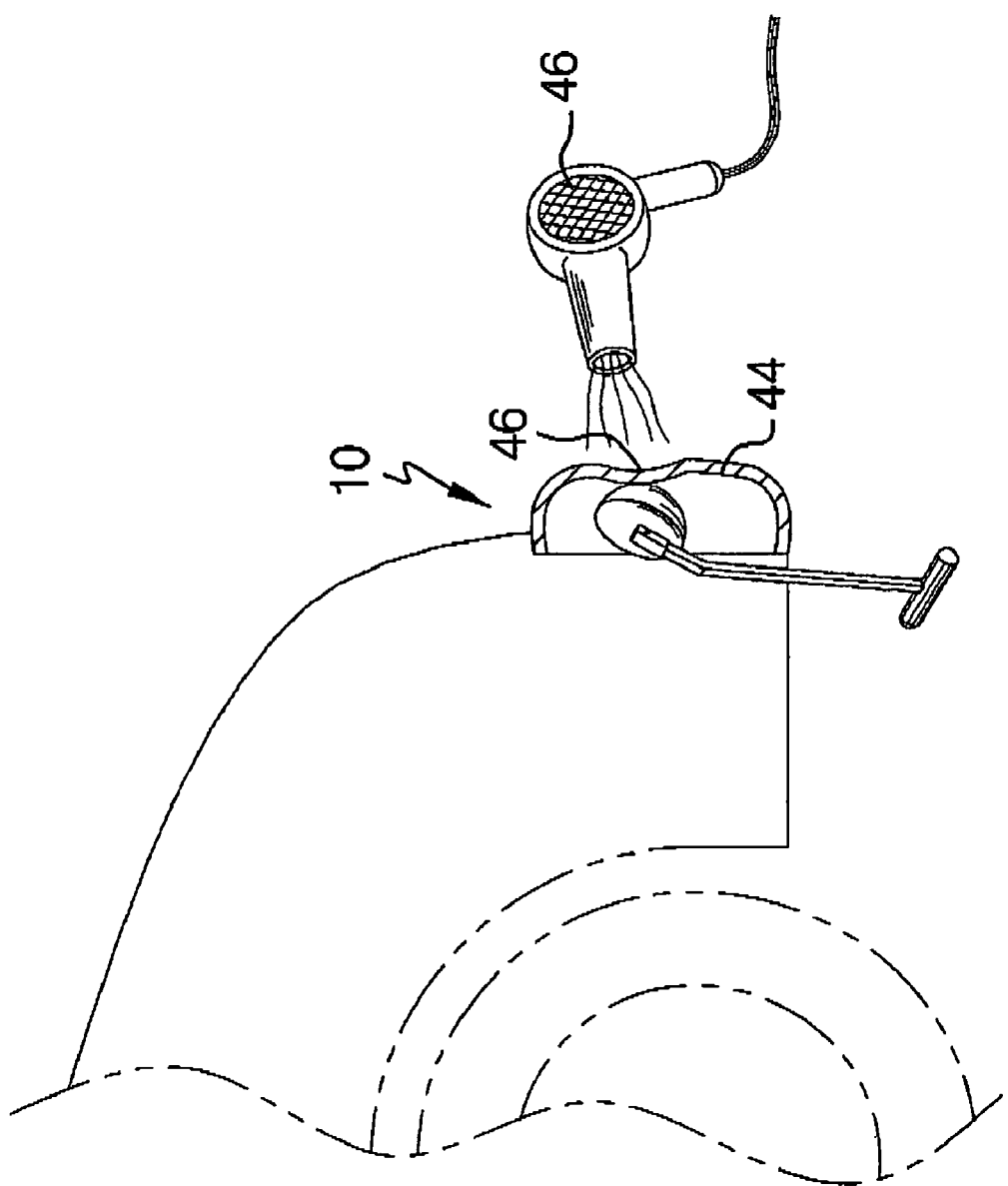
FIG. 1 is a perspective in-use view of a dent removal system according to the present invention.

With reference now to the drawings, and in particular to FIGS. 1 through 7 thereof, a new dent removal device embodying the principles and concepts of the present invention and generally designated by the reference numeral 10 will be described.

Figure 2:
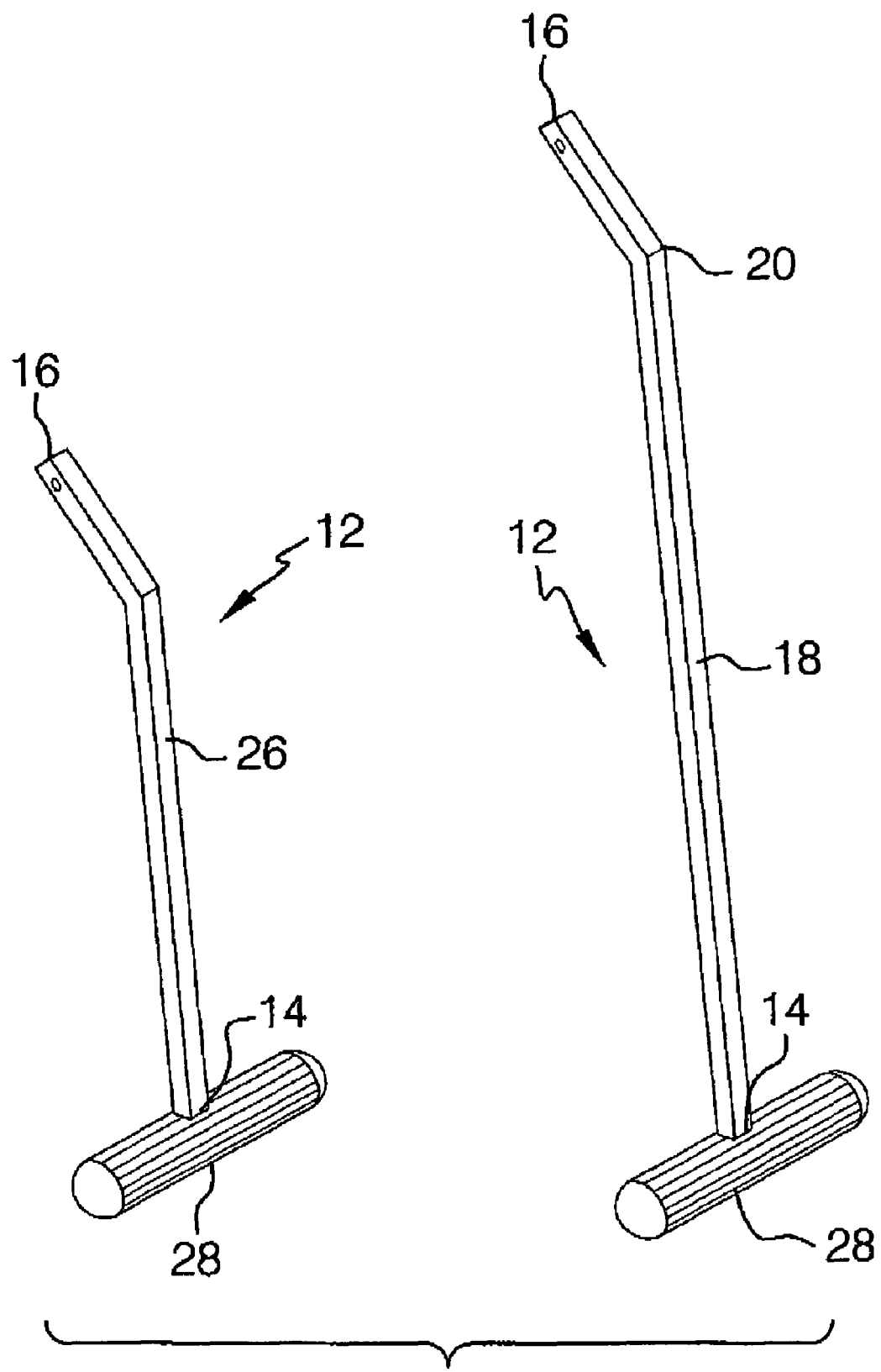
FIG. 2 is a perspective view of embodiments of elongated members of the present invention.
Figure 4:
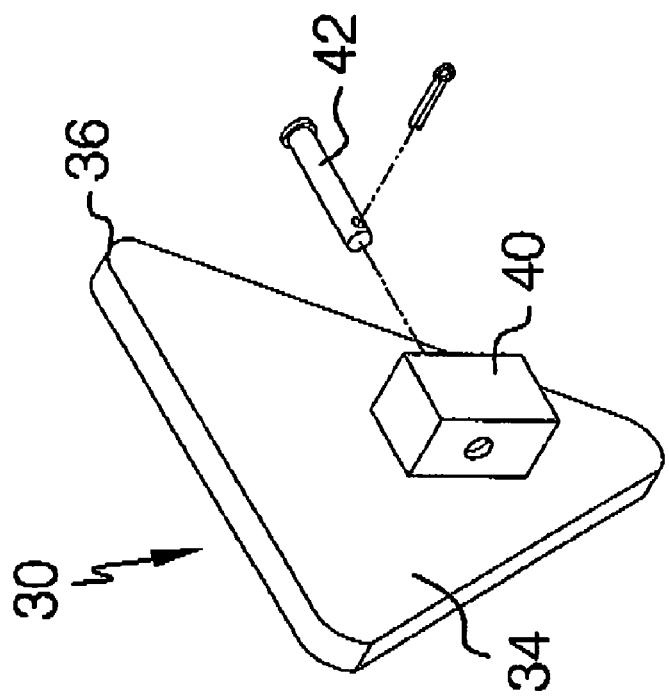
FIG. 4 is a perspective view of an embodiment of a head of the present invention.
Figure 3:
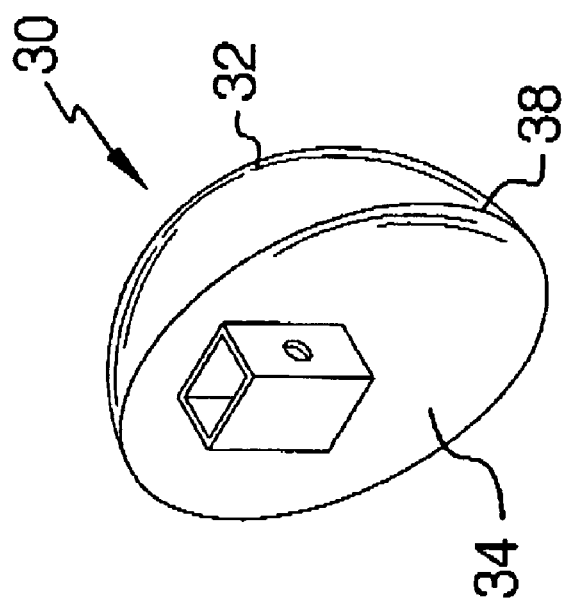
FIG. 3 is a perspective view of a head of the present invention.
Figure 5:
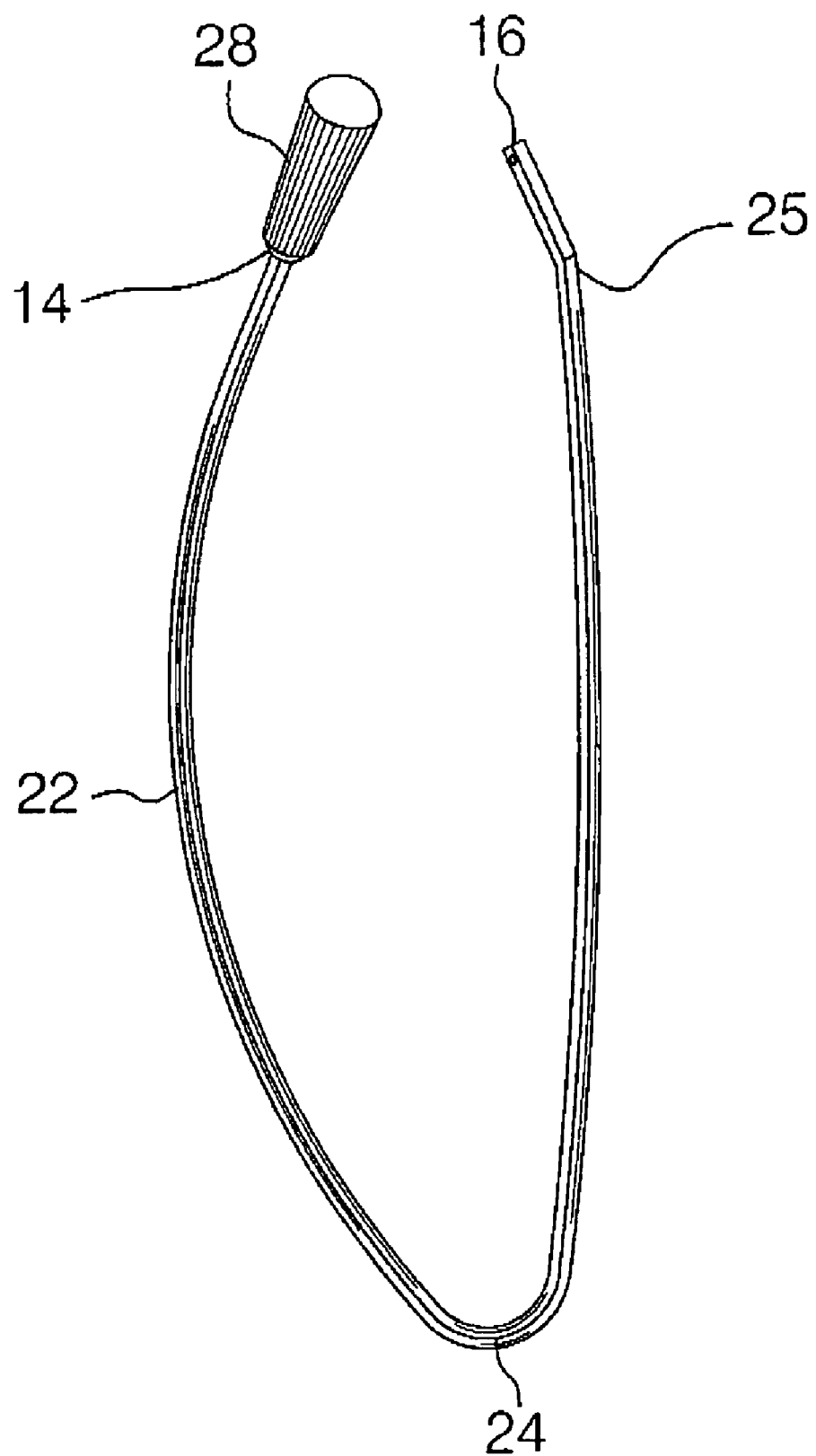
FIG. 5 is a perspective view of an embodiment of the present invention.
Figure 6:
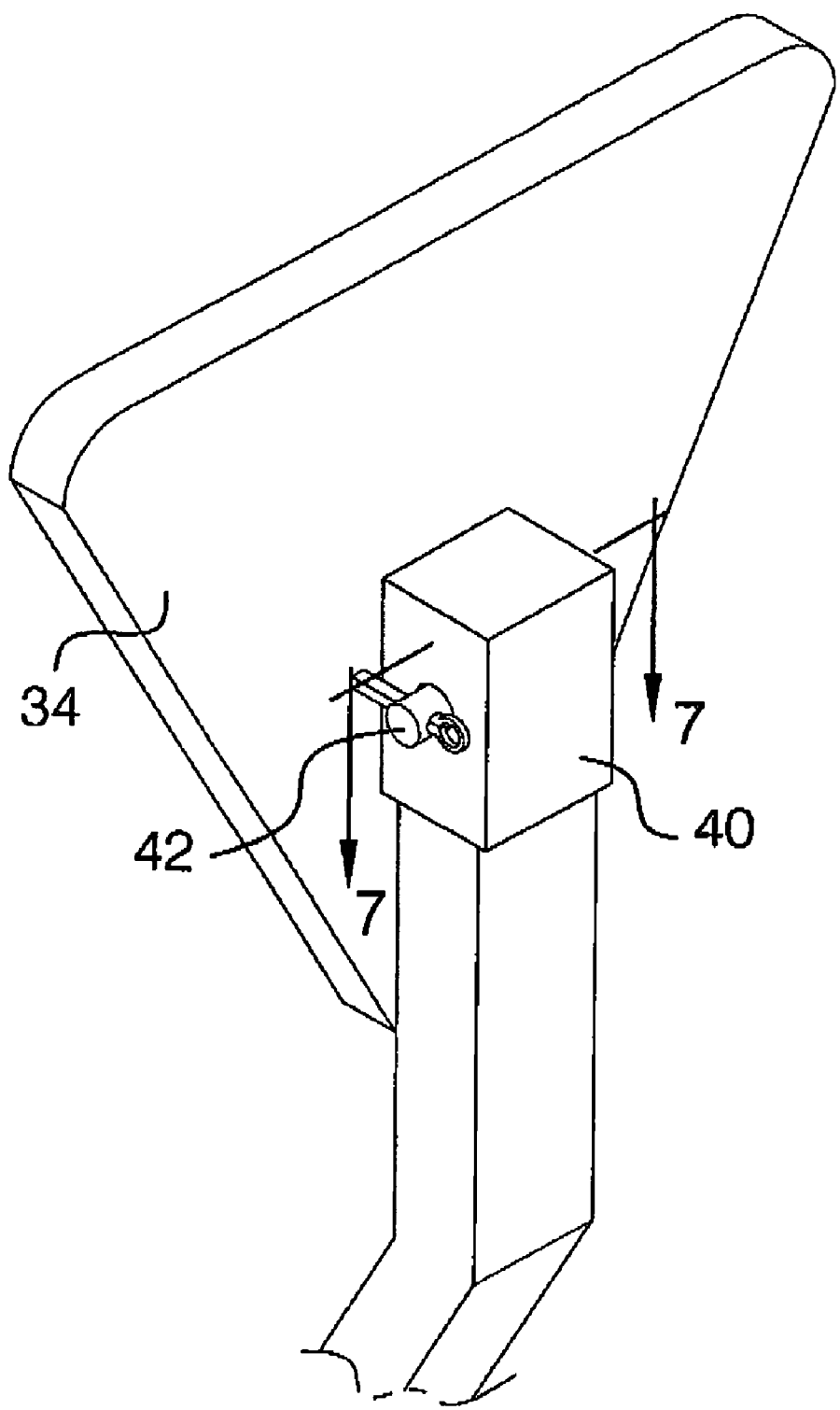
FIG. 6 is a perspective view of the present invention.
Figure 7:
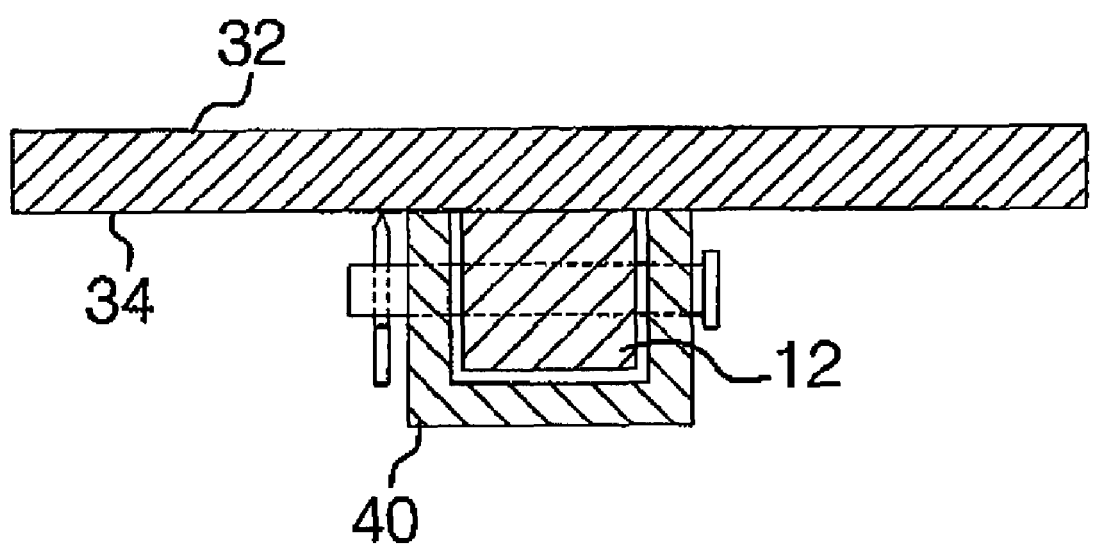
FIG. 7 is a cross-sectional view taken along line 7-7 of FIG. 6 of the present invention.

As best illustrated in FIGS. 1 through 7, the dent removal system 10 generally comprises a plurality of elongated members 12. Each of the elongated members 12 has a first end 14 and a second end 16. Each of the elongated members 12 has a different size or shape with respect to each other. A first elongated member 18 of the elongated members 12 has a bend 20 therein positioned adjacent to the second end. The bend 20 in the first elongated member 18 has an angle between 20 degrees and 40 degrees. A second elongated member 22 of the elongated members 12 has a bend 24 therein positioned between the first 14 and second 16 ends. The bend 24 in the second elongated member 22 is between 145 degrees and 175 degrees. The second elongated member 22 is arcuate from the bend 24 to the first end so that the first 14 and second 16 ends of the second elongated member 22 are positioned adjacent to each other. The second elongated member 22 may have a third bend 25 therein having an angle between 20 degrees and 40 degrees to bend the second end of the second elongated member 22 toward its associated first end 14. A third elongated member 26 is shown in FIG. 2 and differs from the first elongated member 18 only in length. A plurality of handles 28 is provided. Each of the first ends 14 of the elongated members 12 has one of the handles 28 attached thereto.

The system 10 includes a plurality of heads 30. Each of the heads 30 has a first side 32 and a second side 34. A first head 36 of the plurality of heads 30 has a substantially planar first side 32. The first head 36 has a substantially rectangular shape. A second head 38 of the plurality of heads 30 has a convex first side 32.

A plurality of couplers 40 is provided. Each of the second sides 34 has one of the couplers 40 attached thereto. Each of the couplers 40 is configured to releasably secure a selected one of the heads 30 to a selected one of the second ends 16. The couplers 40 each comprise a sleeve for receiving one of the second ends 16. A pin 42 is extendable through connected ones of the sleeve and the elongated member.

In use, the first side 32 of the selected one of the heads 30 is positioned against an inner surface of a bumper 44 while an outer surface the bumper 44 is heated with a heat source 46 to conform the bumper 44 to the first side 34 of the selected one of the heads 30. The first side 32 of the selected one of the heads 30 is thereby used to remove a dent 46 in the bumper 44.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A dent removal system for removing a dent from a plastic bumper, said system including:
   a plurality of elongated members, each of said elongated members having a first end and a second end, each of said elongated members having a different shape and size with respect to each other, each of said elongated members comprising a material solid through its interior;
   a plurality of heads, each of said heads having a first side and a second side, each of said heads having a different shape with respect to each other;
   a plurality of couplers, each of said second sides having one of said couplers attached thereto, each of said couplers being configured to releasably secure a selected one of said heads to a selected one of said second ends; and
   wherein said first side of the selected one of said heads is positioned against an inner surface of the bumper while an outer surface the bumper is heated to conform the bumper to the first side of the selected one of said heads.

2. The system according to claim 1, wherein a first elongated member of said elongated members has a bend therein positioned adjacent to said second end, said bend in said first elongated member having an angle between 20 degrees and 40 degrees.

3. The system according to claim 2, wherein a second elongated member of said elongated members has a bend therein positioned between said first and second ends, said bend in said second elongated member having an angle between 145 degrees and 175 degrees.

4. The system according to claim 3, wherein said second elongated member is arcuate from said bend to said first end so that said first and second ends of said second elongated member are positioned adjacent to each other.

5. The system according to claim 1, further including a plurality of handles, each of said first ends of said elongated members having one of said handles attached thereto.

6. The system according to claim 1, wherein a first head of said plurality of heads has a substantially planar first side.

7. The system according to claim 6, wherein said first head has a substantially rectangular shape.

8. The system according to claim 6, wherein a second head of said plurality of heads has a convex first side.

9. The system according to claim 1, wherein one of said heads of said plurality of heads has a convex first side.

10. The system according to claim 1, wherein each of said couplers comprises a sleeve for receiving one of said second ends, a pin being extendable through connected ones of said sleeve and said elongated member.

11. A dent removal system for removing a dent from a plastic bumper, said system including:
    a plurality of elongated members, each of said elongated members having a first end and a second end, a first elongated member of said elongated members having a bend therein positioned adjacent to said second end, said bend in said first elongated member having an angle between 20 degrees and 40 degrees, a second elongated member of said elongated members having a bend therein positioned between said first and second ends, said bend in said second elongated member being between 145 degrees and 175 degrees, said second elongated member being arcuate from said bend and to said first end so that said first and second ends of said second elongated member are positioned adjacent to each other, each of said elongated members comprising a material being metallic and solid throughout its interior;
    a plurality of handles, each of said first ends of said elongated members having one of said handles attached thereto;
    a plurality of heads, each of said heads having a first side and a second side, a first head of said plurality of heads having a substantially planar first side, said first head having a substantially rectangular shape, a second head of said plurality of heads having a convex first side;
    a plurality of couplers, each of said second sides having one of said couplers attached thereto, each of said couplers being configured to releasably secure a selected one of said heads to a selected one of said second ends, each of said couplers comprising a sleeve for receiving one of said second ends, a pin being extendable through connected ones of said sleeve and said elongated member; and
    wherein said first side of the selected one of said heads is positioned against an inner surface of the bumper while an outer surface the bumper is heated to conform the bumper to the first side of the selected one of said heads.

* * * * *